United States Patent

[11] 3,627,804

[72] Inventors Grish Chandra;
William J. Owen, both of Penarth, Wales
[21] Appl. No. 879,548
[22] Filed Nov. 24, 1969
[45] Patented Dec. 14, 1971
[73] Assignee Midland Silicones Limited
Reading, Berkshire, England
[32] Priority Dec. 4, 1968
[33] Great Britain
[31] 57,632/68

[54] ORGANOSILICON COMPOUNDS
2 Claims, No Drawings
[52] U.S. Cl. .................................................. 260/448.2 Q,
260/46.5 UA, 260/448.2 D, 260/448.2 E
[51] Int. Cl. ................................................... C07f 7/08
[50] Field of Search .......................................... 260/448.2
Q, 448.2 D, 448.2 E

[56] References Cited
UNITED STATES PATENTS
3,249,630  5/1966  Viehe ............................ 260/448.2 Q
3,332,916  7/1967  Hay ............................... 260/448.2 QX
3,418,385  12/1968  Skinner et al. .................. 260/448.2 QX Primary Examiner—James E. Poer
Assistant Examiner—P. F. Shaver
Attorneys—Robert F. Fleming, Jr. and Laurence R. Hobey ABSTRACT: Organosilicon compounds having acetylenic substituents in the molecule are defined by the formula
$$R'(C\equiv C)_m(R_2Si)_n(C\equiv C)_mR',$$
where R is a monovalent hydrocarbon or halogenohydrocarbon radical, preferably methyl or phenyl, R' is H, alkyl, alkenyl, phenyl or triorganosilyl and when $n$ is 0, at least one R' is $R(R_2Si)_p$—where $p$ is 2, 3 or 4, $m$ is 0, 1 or 2, $n$ is 0, 2, 3 or 4, and when $n$ is 0, $m$ is 1. Examples of such compounds are

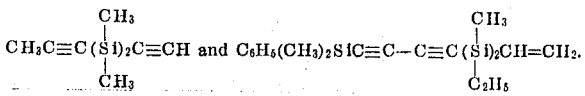

These compounds are useful as intermediates in preparing polymeric organosilicon compounds and as modifiers for organic polymers as well as for use as ultraviolet absorbents.

ORGANOSILICON COMPOUNDS

This invention relates to novel organosilicon compounds containing acetylenic unsaturation and also relates to a process for the preparation of such compounds.

According to this invention, there are provided organosilicon compounds of the general formula $$R'(C \equiv C)_m[SiR_2]_n(C \equiv C)_mR'$$

wherein each R represents a monovalent hydrocarbon radical or monovalent halogenated hydrocarbon radical, $n$ is 0, 2, 3 or 4, $m$ is 0, 1 or 2 and $m$ is 1 when $n$ is 0, there being at least one silicon-bonded —C≡C— group in the molecule, and R' represents a hydrogen atom, an alkyl radical containing less than six carbon atoms, an alkenyl radical containing less than six carbon atoms, a phenyl radical or a triorganosilyl radical or, when $n$ is 0, the radical $R[R_2Si]_p$— in which $p$ is 2, 3 or 4.

The compounds of this invention fall into two classes, depending on the relative positions of the acetylenic and polysilane groups. One class may be represented by the general formula $$R'(C \equiv C)_m[SiR_2]_n(C \equiv C)_mR' \quad (1)$$

and the other by the general formula $$R[R_2Si]_p(C \equiv C)-(C \equiv C)[SiR_2]_pR \quad (2)$$

wherein R is as defined above, R' represents a hydrogen atom, an alkyl radical containing less than six carbon atoms, an alkenyl radical containing less than six carbon atoms, a phenyl radical or a triorganosilyl radical, $n$ and $p$ are each integers of from 2 to 4 inclusive and $m$ has a value of 0, 1 or 2 inclusive, there being at least one silicon-bonded—C≡C—group in the molecule.

In the general formulas, each R can represent any monovalent hydrocarbon or halogenated hydrocarbon radical, for example, an alkyl radical such as the methyl, ethyl, propyl, butyl and dodecyl radicals, an alkenyl radical such as the vinyl and allyl radicals, the phenyl radical, bromophenyl radical, chloromethyl radical and 3,3,3-trifluoropropyl radical. Preferably, the R radicals are selected from methyl and phenyl radicals.

When $n$ is 2, 3 or 4, each R' can represent a hydrogen atom, an alkyl or alkenyl radical containing less than six carbon atoms, e.g., methyl, ethyl, butyl, vinyl or allyl, a phenyl radical or a triorganosilyl radical, preferably wherein the organic radical is a monovalent hydrocarbon radical or halogenated hydrocarbon radical. In this case, the compounds are those represented by the general formula (1). When $n$ is 0, R' represents the $R[R_2Si]_p$—radical and the compounds are those represented by the general formula (2).

Compounds having the general formula (1) can be prepared by the reaction of (1) an acetylenic compound of the general formula $Li(C \equiv C)_mR'$ with (2) a halopolysilane of the formula

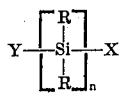

wherein Y represents a halogen atom, preferably chlorine, X represents the R radical or a halogen atom and R, R' and $n$ are as defined above. When the compounds in which one $m$ is zero are desired, the chloropolysilane reactant should be that in which X in the general formula represents the R radical. To prepare compounds of the invention in which each $m$ is a positive integer, the chloropolysilane reactant employed will be that in which X represents a halogen atom.

Compounds of this invention having the general formula (2) can be prepared by the reaction of a diacetylenic compound of the formula $LiC \equiv C-C \equiv CLi$ with a halopolysilane of the general formula $R(R_2Si)_pY$ wherein R, Y and $p$ are as defined above. Preferably, the reactions for preparing the compounds of this invention are performed employing stoichiometric, or approximately stoichiometric, proportions of the halopolysilane and the lithium acetylenic compound. The reactions for preparing the compounds of this invention are carried out in the liquid phase, and when employing the monoacetylenic reactants, may be performed at temperatures up to the reflux temperature of the reaction mixture. When the reaction involves a diacetylenic reactant, it is preferably carried out at temperatures below about 10° C. so that any tendency of the diacetylenic compound to polymerize is minimized. Most preferably, reactions involving the monoacetylenic compounds are performed at temperatures in the range from −20° to +20° C. and those involving the diacetylenic compounds are performed at temperatures in the range from −25° to +5° C.

In the preparation of the compounds of the invention, it is also preferred to employ one or more organic diluents or solvents which serve to homogenize the reaction mixture and/or to facilitate the recovery of the product. Examples of solvents and diluents which may be used are hydrocarbons. e.g., pentane, hexane, benzene, toluene and xylene and ethers, for example, diethyl ether and tetrahydrofuran. The lithiated acetylene reactants employed in the process of this invention can be prepared by reacting a lithium alkyl with the appropriate acetylene, for example, vinyl acetylene or phenyl acetylene or with diacetylene in the liquid phase. The reaction involving lithiation of diacetylene is best performed at relatively low temperatures, e.g., from −20° to −60° C. Lithiation of the monoacetylenic compounds may be carried out at somewhat higher temperatures if desired, e.g., at temperatures up to about 20° C.

The organosilicon-acetylenic compounds of this invention find use as intermediates to the preparation of other organosilicon compounds. They are also useful as ultraviolet absorbents.

The following examples illustrate the invention.

Example 1

A solution of n-butyllithium (2.07 g.) in h-hexane (15 ml.) was added dropwise to a stirred solution of triethylsilyldiacetylene (5.30 g.) in tetrahydrofuran (50 ml.) at −23° C. When addition was complete, the reaction mixture was stirred for a further 45 minutes and 1,2-dichlorotetramethyldisilane (3.02 g.) was added. The temperature of the mixture was allowed to rise to 0° C. with stirring. After 1 hour, the solvent was removed under reduced pressure and replaced with ether.

The ether solution was poured into ice cooled slightly acidic water, the layers separated and the aqueous phase was extracted with ether. The ethereal layer was combined with the ethereal extracts which had been dried over $CaCl_2$, and the mixture concentrated at 20° C./1 mm. for six hours. The residual product was 1,2-bis(triethylsilyl-1'3'-butadiyne)tetramethyldisilane, obtained as a light brown viscous liquid (6.2 g., 86.8 percent). Found: (C, 64.7; H, 9.9; M, 475; $C_{24}H_{42}Si_4$ requires C, 65.2; H, 9.5 and M, 442).

Example 2 n-butyllithium (4.3 g.), phenylacetylene (6.8 g.) and 1,2-dichlorotetramethyldisilane (6.2 g.) where reacted according to the procedure described in example 1. The product was 1,2-bis(phenylethynyl)tetramethyldisilane (8.1 g., 76 percent) which was obtained as a white crystalline solid, b.p. 152° C./0.5 mm. Found: (C, 76.2; H, 6.5; M⁺, 318; M, 329; $C_{20}H_{22}Si_2$ requires C, 75.5; H, 6.9 and M, 318).

Example 3 n-butyllithium (2.38 g.) in n-hexane (20 ml.) was added dropwise to a stirred solution of diacetylene (0.93 g.) in tetrahydrofuran (20 ml.) at −23° C. over a period of 0.5 hour. Stirring was continued for a further period of 1 hour, the reaction mixture allowed to reach 0° C. and pentamethylchlorodisilane (6.19 g.) added. The temperature of the reaction mixture was then permitted to rise to 22° C. and the mixture stirred at this temperature overnight.

Solvent was then removed under reduced pressure and replaced with diethyl ether and the precipitated lithium chloride filtered off. The filtrate, on concentration and sublimation at 110° C./0.2 mm., yielded 1,4-bis(pentamethyldisilanyl)-1,3-butadiyne as a white crystalline solid. Found: (C, 54.1; H, 9.8; M+, 310; M, 308; $C_{14}H_{30}Si_4$ requires C, 54.2; H, 9.7 and M, 310).

Example 4

Phenylacetylene (3.4 g.) was added dropwise to a stirred solution of n-butyllithium (2.13 g.) in n-hexane (15 ml.) and ether (30 ml.), the initial temperature of the solution being allowed to rise from −20° to 0° C. during the addition. Stirring was continued for a further 2 hours with the temperature of the mixture rising to 22° C. and pentamethylchlorodisilane (5.55 g.) added dropwise at this stage. The reaction mixture was then refluxed for 2 hours, allowed to stand and filtered.

When the filtrate was concentrated under reduced pressure and then distilled, the compound pentamethyl(phenylethynyl)disilane was obtained as a colorless liquid (6.2 g., 80.2 percent), b.p. 77° C./0.65 mm. Found: (C, 67.4; H, 8.5; M+, 232; M, 229; $C_{13}H_{20}Si_2$ requires C, 67.2; H, 8.6 and M, 232).

That which is claimed is:

1. Organosilicon compounds of the general formula $R'(C≡C)_m(SiR_2)_n(C≡C)_mR'$ wherein each R represents a monovalent hydrocarbon radical or monovalent halogenated hydrocarbon radical, $n$ is 0, 2, 3 or 4, $m$ is 0, 1 or 2, $m$ is 1 when $n$ is 0, there being at least one silicon bonded —C≡C— group in the molecule, and R' represents a hydrogen atom, an alkyl radical containing less than six carbon atoms, an alkenyl radical containing less than six carbon atoms, or a triorganosilyl radical wherein the organic substituents are monovalent hydrocarbon or halogenated hydrocarbon radicals or, when $n$ is 0, R' is the radical $R(R_2Si)_p$—in which $p$ is 2, 3 or 4.

2. The organosilicon compounds claimed in claim 7 wherein the R radicals are selected from the group consisting of methyl and phenyl radicals.

* * * * *